2 Sheets-Sheet 1.
M. Trapp, Jr.
Dressing Stares.
No. 1947.
Reissued May 2, 1865.
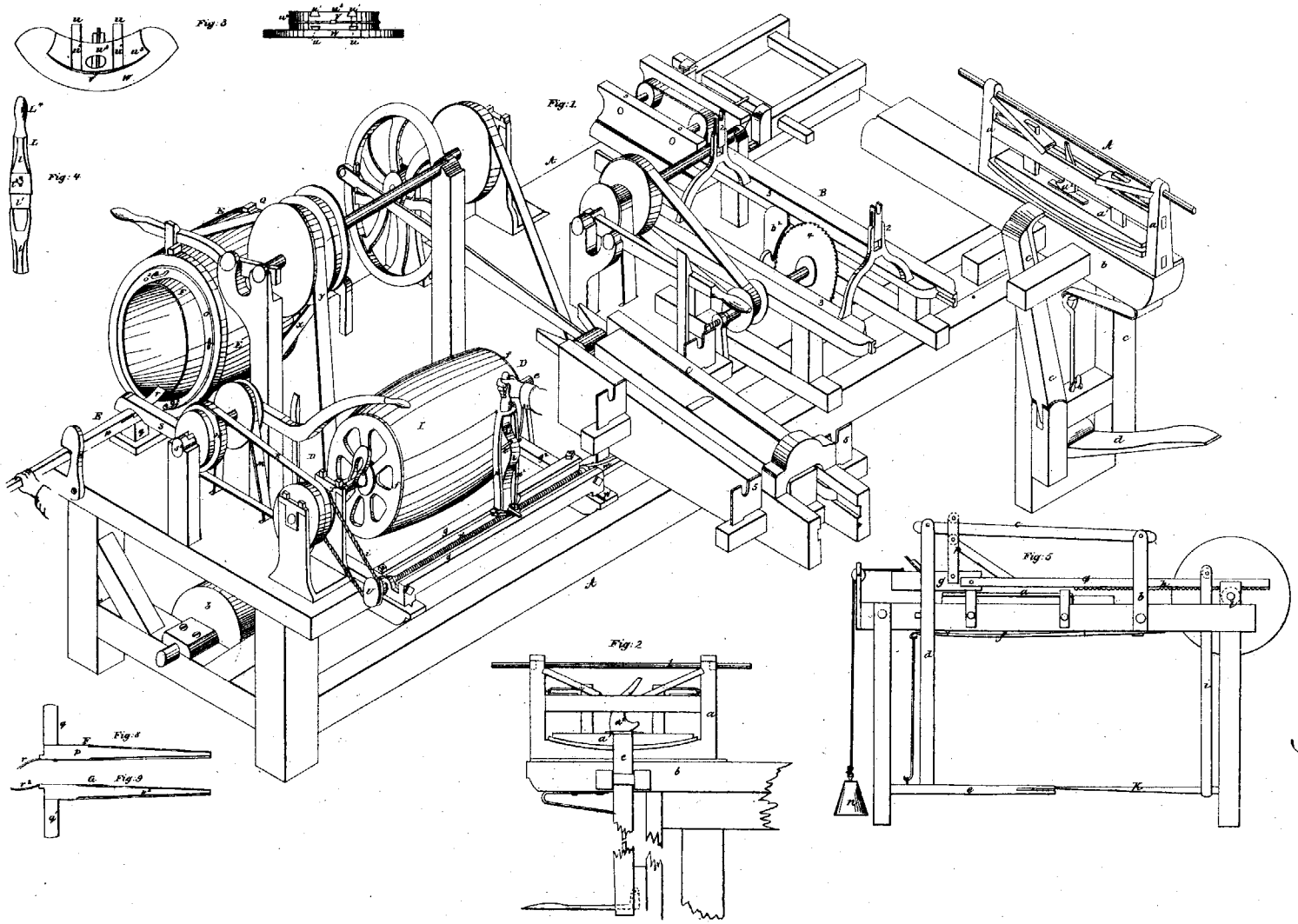
AM. PHOTO-LITHO. CO. N.Y. (OSBORNE'S PROCESS.)

2 Sheets-Sheet 2.
W. Trapp, Jr.
Dressing Stares.
No. 1947. Reissued May 2, 1865.
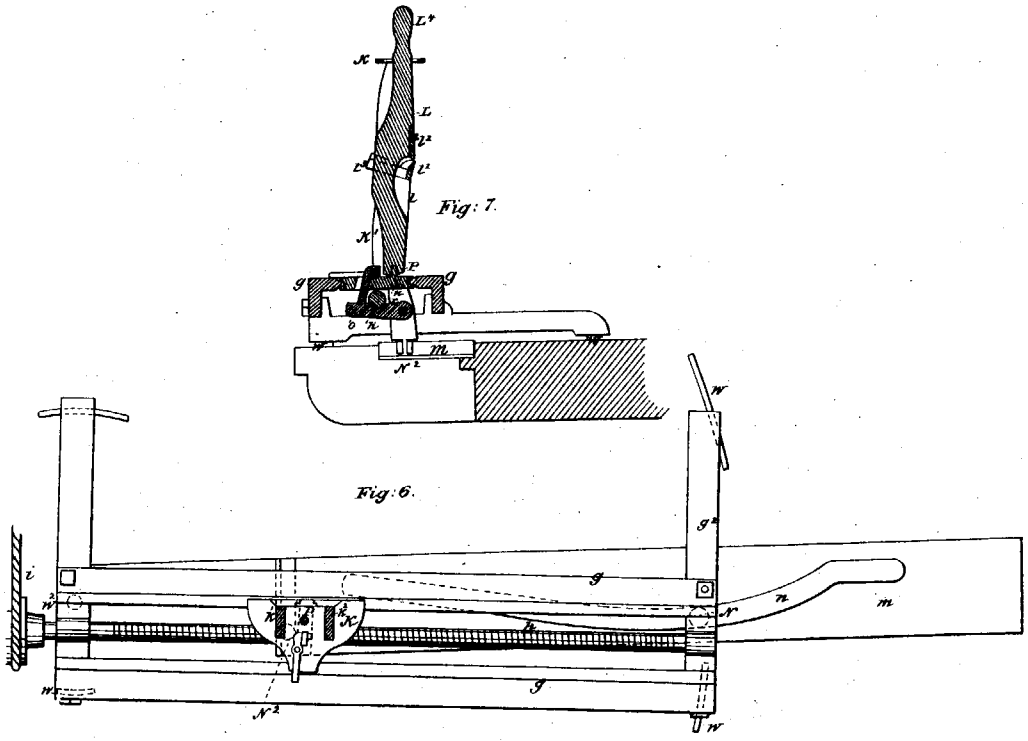
AM. PHOTO-LITHO. CO. N.Y. (OSBORNE'S PROCESS.)

UNITED STATES PATENT OFFICE.

WILLIAM TRAPP, JR., OF ELMIRA, NEW YORK.

IMPROVEMENT IN BARREL MACHINERY.

Specification forming part of Letters Patent No. 4,218, dated October 1, 1845; Reissue No. 132, dated March 10, 1849, and extended 7 years; Reissue No. 1,947, dated May 2, 1865.

DIVISION NO. 2.

*To all whom it may concern:*

Be it known that I, WILLIAM TRAPP, JR., late of Dryden, in the State of New York, but now of Elmira, in said State, have invented a new and useful Improvement in Barrel Machinery; and I do hereby declare the following to be a full, clear, and exact description thereof, which will be better understood by reference to the accompanying drawings, in which—

Figure 1 is an isometrical perspective view of the entire machine. Fig. 2 is a concave bed swing-frame for bilging the staves.

The other figures are only important to illustrate those features of the machine which are intended to be patented in the first division of this amended patent, and need not now be further noticed.

My invention, so far as this second division is concerned, relates to a special contrivance for edging the staves of a barrel so that when put together they shall make perfect joints with each other and form a bilge of the proper shape.

The principle which serves as the basis of my invention is, that in every barrel when completed each of the joints between two adjoining staves should be in a plane surface which passes through the axis of the barrel. If, therefore, the stave be bent into the exact form it is to occupy in the finished barrel, a saw, moving straight forward and passing constantly through the axis of the barrel, will saw the joint in the exact form and with the precise bevel required. The edge may afterward be jointed with a straight-jointer and with the same result.

Having bent the stave into the proper shape I propose, therefore, to cut and joint both the edges, making the stave as wide as its breadth at the center will permit. If it is desirable to have the staves pinch a little harder on the inside than on the outside, the saw should pass a little above the axis of the barrel, so that the planes in which the saw moves in sawing the two edges of the stave shall intersect in a line a little beyond that axis. If they are expected to pinch harder on the outside than on the inside, this line of intersection should be a little nearer the stave than is the axis of the barrel. The same rule should be observed in regard to the plane in which the straight-jointer moves or lies in jointing the edges of the stave.

The contrivances which I usually employ in carrying into practical effect the principle above explained is as follows: I use an apparatus for springing and holding the stave in a frame having a concave bed and swinging the same on a center or turning axle distant from the concave bed a space equal to the semi-diameter of the barrel (or a little more or a little less, according to circumstances, as above explained) which the staves are intended to form, and in the same plane with the revolving circular-saw which is to cut off the edges of the stave. The swing-frame, with the concave bed and follower, swing in the arc of a circle to either side of the saw for the purpose of having both edges cut in succession, however wide or narrow the staves may be, and at a bevel corresponding with the radial lines drawn from the axis on which the frame thus swings; said swing-frame is also used to joint the staves successively on both edges after they shall have been thus edged by the circular-saw.

The concave bed $a^4$, Fig. 2, of the swing-frame, into which the stave is sprung and received, is made to conform to the required bilge of the barrel to be made. Above this concave bed $a^4$ is arranged a follower or platen, $a'$, of the same curve on the under side as the bed $a^4$. This follower is made to slide up and down between the bed $a^4$ and the girt $a^3$, and is employed to bend down the stave and hold it in the concave bed, said follower being held down by an eccentric lever, $a^2$, turning on a pin, $a^8$, inserted into the girt or beam $a^3$, arranged above the follower.

The follower $a'$ is guided in its up-and-down movements by the parallel guiding slide-bars $a^6$, secured firmly in the follower and moving loosely in mortises in the girt or beam $a^3$. To the upper ends of these bars $a^6$ are attached springs $a^7$, resting upon the beams, for the purpose of raising the follower and holding it up out of the way while removing or introducing staves.

The bed $a^4$ and girt $a^3$ are mortised and tenoned into two parallel timbers, which are extended above the beam or girt to receive the center rod or axis on which the frame swings. This swing-frame may, however, be differently constructed and either with a concave or a convex bed. I use a treadle, as shown in Fig. 2, the short arm of which has an anti-friction roller, which, as the treadle descends, is forced down an inclined plane or curved way, as shown by dotted lines in Fig. 2. This arrangement gives great leverage and facility of operation.

When the swing-frame is placed on the platform *b* and a stave put into it under the follower *a'*, the hooks $c^2$ are closed over the edges of the plate $a^5$, placed upon said follower, and forced downward, and the eccentric $a^2$ is then turned so as to hold it in that position. After it is edged and jointed it is again brought under the hooks $c^2$ and pressed down till the eccentric is loosened, and the stave is then taken out and replaced by another.

When the stave is placed in the swing-frame, the axis No. 1 is placed so as to rest in the standards No. 2 in the apparatus B, Fig. 1. These standards are attached to a carriage, 3, which slides past a circular saw, 4, behind which there is a stationary wedge, $b^2$. This saw edges the bent stave on a radial plane passing through the axis, the frame swinging from one side to the other, so as to saw both edges in succession. After this the swing-frame is removed to a straight-jointer, C, Fig. 1, the center rod or axis, 1, thereof resting in guides 5 on the sides of the said jointer and on a level with its face. The swing-frame is laid down first on one side and then on the other to joint the two edges of the stave.

I am aware that John Squier, in his patent of January 21, 1835, has embodied the general principle which my improvement is intended to render practically useful. He proposed to bend the stave into the shape it is to retain when in the cask and then to form the beveled edges and the right taper of the staves by means of two saws which revolved in planes that respectively converged to and passed through a line which is to coincide with the imaginary axis of the cask when completed. He had therefore fully anticipated the fundamental principle on which my invention rests. I do not therefore lay claim to a broad patent of that character; but by the machine shown in Squier's patent no feasible plan was provided for edging staves of varying breadths. They must therefore all be cut of a uniform size, from which a great waste of material would be the necessary result. It is true that Squier describes a method by which the angle between the two saws may be increased or diminished to accommodate broader or narrower staves, but he has made no provision by which the planes in which his saws work shall radiate from the same axial line, and which is indispensable to the practical application of this principle. In fact, the method proposed by him for changing the angle of inclination of the saws would necessarily cause this line of intersection to be constantly changing its position relative to the stave. The planes of his saws would not radiate from a line corresponding to the axial line of the cask and the stave, would not only fail to be edged at the proper bevel, but it would be no longer of the proper shape and taper. It must therefore be by a tedious and difficult operation, and by resorting to means not explained in his specification, that his machine can be made to properly cut staves of different breadths.

My invention provides a ready means for overcoming this defect. It consists in a contrivance by which the plane of the edging-saw shall necessarily pass through a line which will coincide with the axial line of the cask when completed, whatever may be the varying breadths of the staves, which are thus edged.

I have thus shown one method of accomplishing this result by means of a fixed saw and a swinging-frame, which carries the stave; but it is evident that the principle would be the same if the staves were fixed and the saw made to oscillate from one edge of the stave to the other around an axis corresponding to the axial line of the cask, or if two such oscillating saws were provided—one for each edge of the stave—the great end attained in all these cases is to so shape and bevel the staves, whatever their breadths, that when set up in the cask all their joints shall infallibly be in radial planes passing through the axial line of the cask.

What, therefore, I claim as new, and desire to secure by Letters Patent, is—

1. In barrel machinery, jointing the edge of staves, substantially in the manner above described.

2. In machinery for beveling the edges of staves of varying widths while bent into the proper bilge form, providing for retaining the plane of cut in the same position relative to the stave that a radial plane passing through the imaginary axis of the cask and the beveled edge of the stave will occupy when the cask is completed, substantially in the manner described.

3. In barrel machinery, the jointers of a stave of the proper bevel and shape by a straight-jointer, while the stave is so bent that the joint, when it shall be placed in the cask, will be in a radial plane passing through the axis of the cask, substantially in the manner above shown.

WILLIAM TRAPP, JR.

Witnesses:

D. R. LEWIS,

ALBERT STONE.